Figure 1:
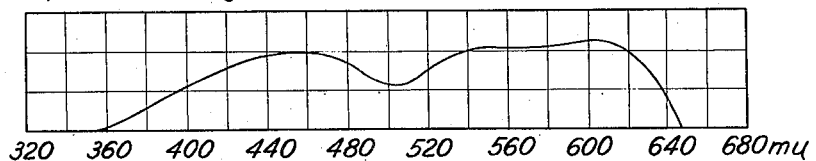

March 4, 1941.  L. G. S. BROOKER ET AL  2,233,511
1,1'-DIARALKYL-4,4'-CARBOCYANINE SALTS
Filed Nov. 20, 1937

2,2'-Dibenzylthiacarbocyanine Iodide.

2,2'-Di-(β-phenylethyl)-thiacarbocyanine Iodide.

1,1'-Dibenzyl-4,4'-carbocyanine Iodide.

1,1'-Di-(β-phenylethyl)-4,4'-carbocyanine Iodide.

2,2'-Dibenzylthiatricarbocyanine Iodide.

Leslie G. S. Brooker
Lloyd A. Smith
INVENTORS

N. M. Perrins
BY Daniel J. Mayne
ATTORNEYS

UNITED STATES PATENT OFFICE 2,233,511

1,1'-DIARALKYL-4,4'-CARBOCYANINE SALTS

Leslie G. S. Brooker and Lloyd A. Smith, Rochester, N. Y., assignors to Eastman Kodak Company, Rochester, N. Y., a corporation of New Jersey Application November 20, 1937, Serial No. 175,686

5 Claims. (Cl. 260—240)

This invention relates to new dyes and to photographic emulsions containing the same.

A number of cyanine dyes are known and some of these have been found to sensitize photographic emulsions in different useful manners. We have now found that if, in cyanine dyes which sensitize, at least one of the alkyl groups on the cyanine nitrogen atoms is an aralkyl group devoid of nitro groups, the sensitizing properties of the dyes are considerably altered so that from such dyes new and useful photographic emulsions can be prepared. We have found that the alteration in sensitizing properties is most pronounced in sensitizing dyes of the carbocyanine, dicarbocyanine, tricarbocyanine, tetracarbocyanine and pentacarbocyanine groups.

It is accordingly among the objects of our invention to provide new cyanine dyes in which at least one of the alkyl groups on the cyanine nitrogen atoms is an aralkyl group devoid of nitro groups. A further object is to provide a process for preparing such dyes. A further object is to provide intermediate compounds for the preparation of such dyes and a process for the preparation of such intermediate compounds. A still further object is to provide photographic emulsions sensitized in a novel and useful manner. A still further object is to provide a photographic element containing such sensitized photographic emulsions. Still other more specific objects and advantages will become apparent hereinafter.

Our new dyes can be prepared utilizing cyclammonium aralkyl quaternary salts which can be prepared as hereinafter set forth. Cyclammonium aralkyl quaternary salts can be prepared for example by reacting a heterocyclic nitrogen base with aralkyl halides. We have found the aralkyl bromides and iodides are advantageously employed. Heat accelerates the formation of our new quaternary salts. Diluents can be employed in the reaction mixture, although they are not essential. The aralkyl quaternary halides can be converted into the less soluble quaternary salts, e. g., the alalkyl bromides into iodides or perchlorates, by treating solutions of the quaternary halides with solutions of soluble iodides or perchlorates.

While our method of obtaining aralkyl quaternary salts is subject to variation, particularly as respects the nature and quantity of heterocyclic nitrogen base employed, the nature and quantity of aralkyl halide employed, the temperatures employed, the nature and quantity of aralkyl halide employed, the nature and quantity of diluent employed, if any, the time of reaction employed and the method of isolation and purification of the quaternary salts, the following examples will serve to illustrate the mode of obtaining our new quaternary salts. These examples are not intended to limit our invention.

EXAMPLE 1.—*2-iodoquinoline benziodide*

5.1 g. (1 mol.) of 2-iodoquinoline and 4.36 g. (1 mol.) of benzyl iodide were heated together at about 100° C. for about one week. The crude quaternary salt was recrystallized from nitromethane and obtained as yellowish crystals melting at 190° to 192° C. with decomposition.

EXAMPLE 2.—*1-methylbenzothiazole benzobromide*

7.5 g. (1 mol.) of 1-methylbenzothiazole and 8.6 g. (1 mol.) of benzyl bromide were heated together in about 25 cc. of dry chloroform at the refluxing temperature for about 15 hours. The crude quaternary bromide separated from the reaction mixture. It was recrystallized from methyl alcohol and obtained as cream colored crystals melting at 231° to 232° C. with decomposition.

EXAMPLE 3.—*1-methylbenzothiazole benziodide*

14 g. (1 mol.) of 1-methylbenzothiazole benzobromide were dissolved in about 20 cc. of hot water and treated with 30 cc. of an aqueous solution containing 15 g. (2 mol.) of potassium iodide. The crude quaternary iodide separated from the cooled reaction mixture. It was thrice recrystallized from methyl alcohol and obtained as cream colored crystals melting at 207° to 210° C. with decomposition.

EXAMPLE 4.—*Quinaldine benziodide*

10 g. (1 mol.) of quinaldine and 12 g. (1 mol.) of benzyl bromide were heated together at about 100° C. for about 15 hours. The cooled solid reaction mass was broken up and ground with acetone. The crude solid quaternary bromide was dissolved in about 10 cc. of hot methyl alcohol. The solution was filtered and the quaternary bromide precipitated therefrom by adding diethyl ether. The so precipitated bromide was dissolved in about 20 cc. of hot water and treated with a concentrated aqueous solution of potassium iodide containing 3.3 g. (2 mol.) of potassium iodide. The crude quaternary iodide separated from the reaction mixture. It was twice recrystallized from hot water, decolorizing the solution of activated charcoal, and obtained as orange-yellow needles melting at 220° to 221° C. with decomposition.

Example 5.—Lepidine benziodide 4.8 g. (1 mol.) of lepsidine and 5.7 g. (1 mol.) of benzyl bromide were heated together in about 10 cc. of dry chloroform at the refluxing temperature for about 2 days. The crude quaternary bromide was filtered off and dissolved in about 30 cc. of hot water. The aqueous solution of the quaternary bromide was treated with 10 cc. of an aqueous solution of potassium iodide containing 11 g. (2 mol.) of potassium iodide. The crude quaternary iodide separated from the reaction mixture and was thrice recrystallized from methyl alcohol. It was obtained as yellow crystals melting at 161° to 163° C. with decomposition.

Example 6.—Quinoline benziodide 12.9 g. (1 mol.) of quinoline and 17.1 g. (1 mol.) of benzyl bromide were heated together at about 100° C. for about 4 hours. The solid reaction mass was dissolved in about 40 cc. of methyl alcohol and treated with a concentrated aqueous solution of potassium iodide containing 28.6 g. of potassium iodide. The benziodide precipitated as yellow crystals melting at 165° to 166° C. with decomposition.

Example 7.—1-methylbenzothiazole β-phenylethiodide 14.9 g. (1 mol.) of 1-methylbenzothiazole and 18.5 g. (1 mol.) of β-phenylethyl bromide were heated together at about 100° C. for about 6 days. The crude quaternary bromide was dissolved in hot water and treated with a concentrated aqueous solution of potassium iodide containing 13.5 g. of potassium iodide. The quaternary iodide separated from the reaction mixture. It was recrystallized from methyl alcohol and obtained as colorless crystals melting at 200° to 201° C. with decomposition.

Example 8.—Quinaldine β-phenylethiodide 28.6 g. (1 mol.) of quinaldine and 37.0 g. (1 mol.) of β-ethylbromide were heated together at about 100° C. for about 6 days. The solid dark mass was dissolved in hot water and treated with a concentrated aqueous solution of potassium iodide containing 32 g. of potassium iodide. The quaternary iodide precipitated as brownish yellow crystals. It was recrystallized from water and obtained as yellowish crystals melting at 190° to 191° C. with decomposition.

In a manner similar to that illustrated in the above eight examples, aralkyl quaternary salts of 1 - methylbenzoxazole, μ - methylnaphthothiazoles, μ - methylnaphthoxazoles, 2 - methyl-4-phenylthiazole, 1 - methylbenzoselenazole, 2-methyl-4-phenyloxazole, 2 - methyl - 4 - phenylselenazole, 2,4-dimethylthiazole, 2-phenylthioquinoline, 2-methylthiobenzothiazole, 2-butylthiobenzothiazole, α- and γ-picolines or the like can be prepared. We have illustrated particularly the formation of aralkyl quaternary salts from quinoline, and benzothiazole bases since nuclei corresponding to these bases are found in a number of good sensitizing dyes. Still other aralkyl quaternary salts of heterocyclic nitrogen bases can be prepared by treating the heterocyclic nitrogen bases, as set forth in the foregoing examples, with esters, such as β-phenylethyl toluenesulfonate or γ-phenyl-n-propyl toluenesulfonate. Such esters can be prepared, for example, from β-phenylethyl and γ-phenyl-n-propyl alcohols by the method for preparing toluenesulfonate esters described by Földi in Berichte der deutschen chemischen Gesellschaft, vol. 53, page 1836 (1920), for example. However, we have found that our new dyes are advantageously prepared employing the aralkyl quaternary halides. While we have illustrated particularly the formation of aralkyl quaternary salts from unsubstituted heterocyclic nitrogen bases such as quinoline and benzothiazole, heterocyclic nitrogen bases, particularly those containing a benzene nucleus containing ordinary simple substituents particularly in the benzene nuclei can also be converted into aralkyl quaternary salts as set forth above. For example, heterocyclic nitrogen bases containing substituents such as dialkylamino, alkyl, alkoxy or acylamino groups on halogen atoms can be converted into aralkyl quaternary salts. Instead of benzyl iodide in the above examples, chlorobenzyl, methylbenzyl or methoxybenzyl iodide, for example, can be employed.

Having set forth the manner of obtaining the intermediates necessary to the preparation of our new dyes, a number of examples of the preparation of various cyanine dyes of sensitizing types from such intermediates are hereinafter set forth.

Our new intermediates can be employed in preparing simple cyanine dyes, i. e. cyanine dyes containing a single methenyl group between two heterocyclic nuclei, for example simple thiacyanines, simple oxacyanines, simple 4,4'-cyanines, simple selenacyanines, simple oxathiacyanines, simple 2,2'-pyridocyanines, pseudocyanines, such as thia-2'-cyanines, thiazolo-2'-cyanines, oxazolo-2'-cyanines, selenazolo-2'-cyanines, selena-2'-cyanines, thiazolino - 2' - cyanines, benzothia-2'-cyanines and 2,2'-cyanines and isocyanines, such as thia-4-cyanines, 2,4'-cyanines and selena-4'-cyanines. The following examples are illustrative of the manner of obtaining simple cyanine dyes from our new quaternary salts. These examples are not intended to limit our invention.

Example 9.—1'-benzyl-2-ethylthia-2'-cyanine iodide 2.62 g. (1 mol.) of 1-methylbenzothiazole etho-p-toluene-sulfonate and 3.55 g. (1 mol.) of 2-iodoquinoline benziodide were heated together in 15 cc. of absolute ethyl alcohol containing 2.2 cc. (2.1 mol.) of triethylamine at the refluxing temperature for about 20 minutes. The dye separated from the cooled reaction mixture. The dye was twice recrystallized from methyl alcohol and obtained as dark crystals having a bluish reflex. It gave an orange colored methyl alcohol solution and melted at 243° to 245° C. with decomposition. The dye has the following formula:

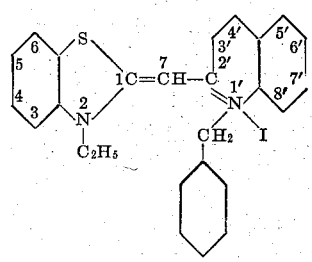

Employing 1 - methylbenzothiazole metho - p - toluenesulfonate instead of etho, 1'-benzyl-2-methylthia-2'-cyanine iodide can be obtained as reddish-orange crystals with a bright reflex and melting at 256° to 258° C. with decomposition.

EXAMPLE 10.—*2-benzyl-1'-ethylthia-2'-cyanine iodide*

3.67 g. (1 mol.) of 1-methylbenzothiazole ethiodide and 4.1 g. (1 mol.) of 2-iodoquinoline benziodide were heated together in 35 cc. of absolute ethyl alcohol containing 3.0 cc. (2.1 mol.) of triethylamine at the refluxing temperature for about twenty minutes. The dye separated from the cooled reaction mixture. The dye was twice recrystallized from methyl alcohol and obtained as an orange powder which gave a brownish-orange methyl alcohol solution and melted at 256° to 258° C. The dye has the following formula:

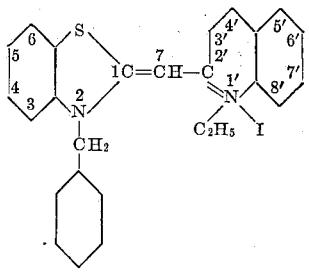

Employing 2-iodoquinoline methiodide instead of the ethiodide, 2-benzyl-1'-methylthia-2'-cyanine iodide can be obtained as dark crystals having a green reflex, giving a reddish-orange methyl alcoholic solution and melting at 260° to 261° C. with decomposition.

EXAMPLE 11.—*1',2-dibenzylthia-2'-cyanine iodide*

1.22 g. (1 mol.) of 1-methylbenzothiazole benziodide and 1.58 g. (1 mol.) of 2-iodoquinoline benziodide were heated together in about 10 cc. of absolute ethyl alcohol containing 1.0 cc. (2.1 mol.) of triethylamine at the refluxing temperature for about twenty minutes. The dye separated from the cooled reaction mixture. It was recrystallized from methyl alcohol and obtained as orange crystals giving a brownish-orange methyl alcoholic solution and melting at 253° to 255° C. with decomposition. The dye has the following formula:

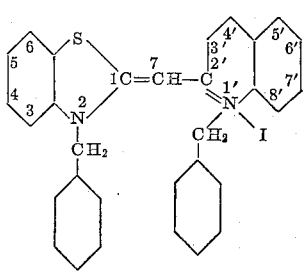

EXAMPLE 12.—*1'-benzyl-2-ethylthia-4'-cyanine iodide*

3.05 g. (1 mol.) of 1-methylbenzothiazole ethiodide and 6.94 g. (2 mol.) of quinoline ethiodide were heated together in 15 cc. of absolute ethyl alcohol containing 1.4 g. (2 mol.) of 85% potassium hydroxide at the refluxing temperature for about twenty minutes. The dye separated from the cooled reaction mixture. It was twice recrystallized from methyl alcohol and obtained as orange-red crystals giving a reddish-orange methyl alcoholic solution and melting at 268° to 270° C. with decomposition. The dye has the following formula:

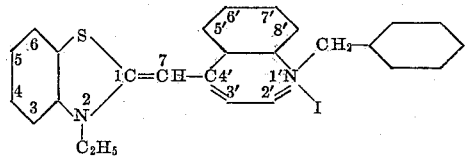

Employing 1-methylbenzothiazole benziodide instead of ethiodide and quinoline ethiodide instead of benziodide, 2-benzyl-1'-ethylthia-4'-cyanine iodide can be similarly obtained as fine orange-red crystals melting at 280° to 282° C. with decomposition.

EXAMPLE 13.—*1',2-dibenzylthia-4'-cyanine iodide*

3.67 g. (1 mol.) of 1-methylbenzothiazole benziodide and 6.94 g. (2 mol.) of quinoline benziodide were heated together in 25 cc. of absolute ethyl alcohol containing 1.4 g. (2 mol.) of 85% potassium hydroxide at the refluxing temperature for about twenty minutes. The dye separated from the cooled reaction mixture. The dye was twice recrystallized from methyl alcohol and obtained as orange-red crystals which gave a reddish-orange methyl alcoholic solution and melted at 265° to 266° C. with decomposition. The dye has the following formula:

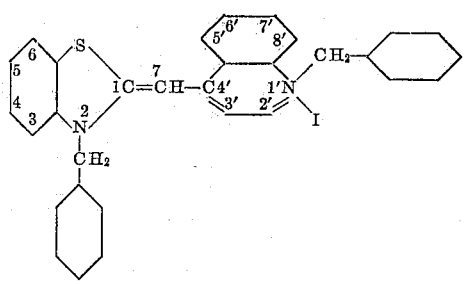

EXAMPLE 14.—*1,1'-dibenzyl-2,2'-cyanine iodide*

1.2 g. (1 mol.) of quinaldine benziodide and 1.58 g. (1 mol.) of 2-iodoquinoline benziodide were heated together in 10 cc. of absolute ethyl alcohol containing 1.0 cc. (2.1 mol.) of triethylamine at the refluxing temperature for about twenty minutes. The dye separated from the cooled reaction mixture. It was recrystallized from methyl alcohol and obtained as reddish-brown flakes having a golden reflex and giving a reddish-orange methyl alcoholic solution. The dye melted at 238° to 240° C. with decomposition. The dye has the following formula:

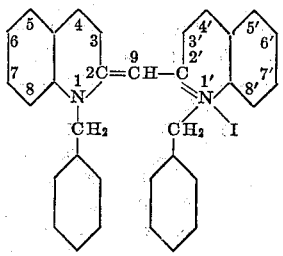

EXAMPLE 15.—*1-benzyl-1'-ethyl-2,2'-cyanine iodide*

1.5 g. (1 mol.) of quinaldine ethiodide and 2.37 g. (1 mol.) of 2-iodoquinoline benziodide were heated together in 10 cc. absolute ethyl alcohol containing 1.5 cc. (2.1 mol.) of triethylamine at the refluxing temperature for about twenty minutes. The dye separated from the reaction mixture upon chilling. The dye was recrystallized from methyl alcohol and obtained as garnet crystals having a green luster and giving a reddish-orange methyl alcoholic solution. The dye melted at 233° to 235° C. with decomposition. The dye has the following formula:

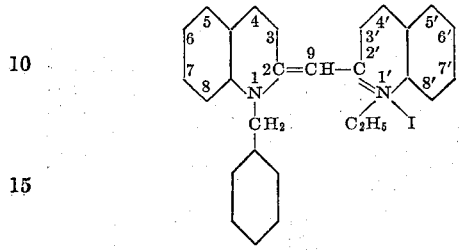

By treating 3.6 g. of quinaldine benziodide and 3.91 g. of 2-iodoquinoline methiodide as set forth in this example, 1-benzyl-1'-methyl-2,2'-cyanine iodide can be prepared. This dye was obtained as large reddish-brown crystals having a green reflex and giving a reddish-orange methyl alcoholic solution. It melted at 220° to 222° C. with decomposition.

EXAMPLE 16.—*1-benzyl-1'-methyl-2,4-cyanine iodide*

2.14 g. (1 mol.) of lepidine methiodide and 3.55 g. (1 mol.) of 2-iodoquinoline benziodide were heated together in absolute ethyl alcohol containing 2.2 cc. (2.1 mol.) of triethylamine at the refluxing temperature for about twenty minutes. The dye separated from the reaction mixture upon chilling. After two recrystallizations from methyl alcohol, the dye was obtained as large, long, green, lustrous crystals which gave a bluish-red methyl alcoholic solution. The dye melted at 249° to 251° C. with decomposition. The dye has the following formula:

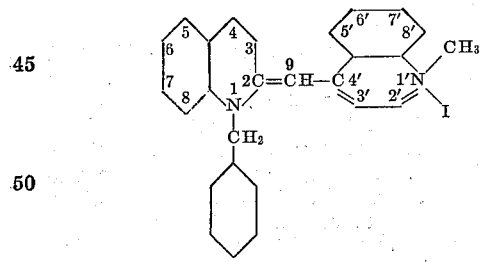

By treating 3.61 g. of lepidine benziodide and 3.97 g. of 2-iodoquinoline methiodide as described in this example, 1'-benzyl-1-methyl-2,4'-cyanine iodide can be obtained as green needles having a bright reflex and giving a bluish-red methyl alcoholic solution. This dye melts at 266° to 268° C. with decomposition.

Likewise, by treating 2.25 g. of lepidine ethiodide and 3.55 g. of 2-iodoquinoline benziodide in the manner set forth in this example, 1-benzo-1'-ethyl-2,4'-cyanine iodide can be prepared. This dye, after two recrystallizations from methyl alcohol, was obtained as lustrous green crystals giving a bluish-red methyl alcoholic solution and melting at 239° to 242° C. with decomposition.

By treating 0.9 g. of lepidine benziodide and 1.03 g. of 2-iodoquinoline ethiodide as set forth in this example, 1'-benzyl-1-ethyl-2,4'-cyanine iodide can be obtained. However, it is necessary to add diethyl ether to the reaction mixture after heating for twenty minutes and then cooling in order to precipitate the dye. After recrystallization from methyl alcohol the dye was obtained as minute dark crystals having a bright reflex and giving a crimson methyl alcoholic solution. The dye melted at 263° to 264° C. with decomposition.

EXAMPLE 17.—*1,1'-dibenzyl-2,4'-cyanine iodide*

1.2 g. (1 mol.) of lepidine benziodide and 1.58 g. (1 mol.) of 2-iodoquinoline benziodide were heated together in 10 cc. of ethyl alcohol containing 1.0 cc. (2.1 mol.) of triethylamine at the refluxing temperature for about twenty minutes. The dye separated from the reaction mixture upon chilling. It was recrystallized from methyl alcohol and obtained as large, lustrous green needles having a bright reflex and giving a bluish-red solution. The dye melted at 216° to 218° C. with decomposition and has the following formula:

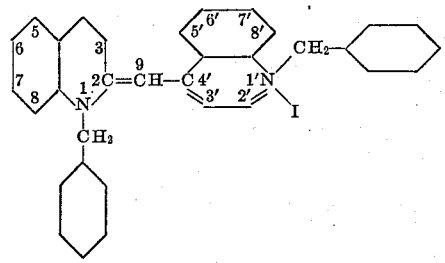

EXAMPLE 18.—*1-benzyl-1'-methyl-4,4'-cyanine iodide*

3.61 g. (1 mol.) of lepidine benziodide and 5.42 g. (2 mol.) of quinoline methiodide were heated together in 20 cc. of absolute ethyl alcohol containing 1.4 g. (2 mol.) of 85% potassium hydroxide at the refluxing temperature for about twenty minutes. The dye separated from the cooled reaction mixture. After two recrystallizations from methyl alcohol, the dye was obtained as minute light green crystals having a shining reflex and giving a blue methyl alcoholic solution. The dye melted at 266° to 267° C. with decomposition. The dye has the following formula:

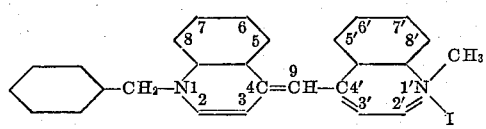

By treating 3.61 g. of lepidine benziodide and 5.7 g. of quinoline ethiodide as set forth in this example, 1-ethyl-1'-benzyl-4,4'-cyanine iodide can be obtained. However, it is necessary to chill the reaction mixture in order to cause separation of the dye. After two recrystallizations from methyl alcohol, the dye was obtained as grayish-green crystals having a bright reflex and giving a blue methyl alcoholic solution. The dye melted at 234° to 236° C. with decomposition.

EXAMPLE 19.—*1,1'-dibenzyl-4,4'-cyanine iodide*

3.61 g. (1 mol.) of lepidine benziodide and 6.94 g. (2 mol.) of quinoline benziodide were heated together in absolute ethyl alcohol (15 cc.) containing 1.4 g. (2 mol.) of 85% potassium hydroxide at the refluxing temperature for about twenty minutes. The dye separated from the reaction mixture upon chilling. After two recrystallizations from methyl alcohol, the dye was obtained as large, lustrous green crystals having a bronze reflex and giving a blue methyl alcoholic solution.

The dye melted at 183° to 187° C. with decomposition and has the following formula:

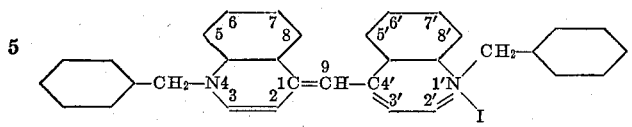

EXAMPLE 20.—1'-ethyl-2-(β-phenylethyl)-thia-2'-cyanine iodide 0.97 g. (1 mol.) of 1-methylbenzothiazole β-phenylethiodide and 1.03 g. (1 mol.) of 2-iodoquinoline ethiodide were heated together in 10 cc. of absolute ethyl alcohol containing 0.75 cc. (2.1 mol.) of triethylamine at the refluxing temperature for about twenty minutes. The dye separated from the reaction mixture upon chilling. After recrystallization from methyl alcohol, the dye was obtained as orange crystals having a golden reflex and giving a golden brown methyl alcoholic solution. The dye melted at 215° to 217° C. with decomposition and has the following formula:

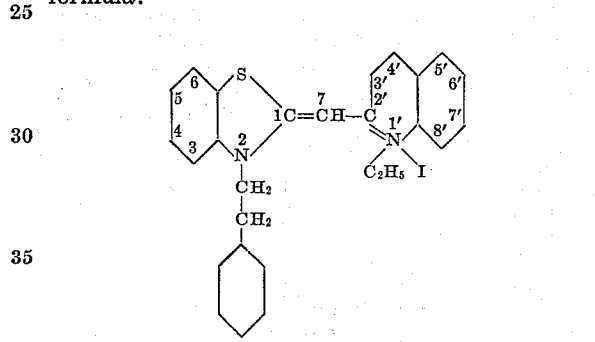

By treating 3.81 g. of 1-methylbenzothiazole β-phenyl-ethiodide and 3.97 g. of 2-iodoquinoline ethiodide as set forth in this example, 1'-methyl-2-(β-phenylethyl)-thia-2'-cyanine iodide can be prepared. After recrystallization from methyl alcohol, the dye was obtained as brown crystals melting at 260° to 261° C. with decomposition. The dye gave an orange methyl alcoholic solution.

EXAMPLE 21.—1-ethyl-1'-(β-phenylethyl)-2,2'-cyanine iodide 3.75 g. (1 mol.) of quinaldine β-phenylethiodide and 4.1 g. (1 mol.) of 2-iodoquinoline ethiodide were heated together in about 10 cc. of absolute ethyl alcohol containing 2.9 cc. (2.1 mol.) of triethylamine at the refluxing temperature for about twenty minutes. Diethyl ether was added to the cooled reaction mixture to precipitate the dye. After recrystallization from methyl alcohol, the dye was obtained as red-brown needles having a bright greenish-bronze reflex and giving a pinkish-red methyl alcoholic solution. The dye melted at 149° to 151° C. with decomposition.

By treating 3.75 g. of quinaldine β-phenylethiodide and 3.97 g. of 2-iodoquinoline methiodide as set forth in this example, 1-methyl-1'-(β-phenylethyl)-2,2'-cyanine iodide can be prepared. However, it is not necessary to add diethyl ether to the cooled reaction mixture, as the dye separates even while the reaction mixture is hot. After recrystallization from methyl alcohol, the dye was obtained as small brownish crystals having a metallic green reflex and giving a pinkish-red solution in methyl alcohol. The dye melted at 250° to 251° C. with decomposition.

EXAMPLE 22.—1-ethyl-1'-(β-phenylethyl) 2,4'-cyanine iodide 1.88 g. (1 mol.) of lepidine β-phenylethiodide and 2.06 g. (1 mol.) of 2-iodoquinoline ethiodide were heated together in 15 cc. of absolute ethyl alcohol containing 1.46 cc. (2.1 mol.) of triethylamine at the refluxing temperature for about twenty minutes. The dye separated from the reaction mixture upon chilling. After recrystallization from methyl alcohol, the dye was obtained as greenish-bronze crystals melting at 225° to 227° C. with decomposition, and giving a crimson methyl alcoholic solution. The dye has the following formula:

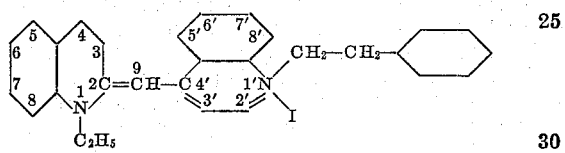

In the above examples of the preparation of simple cyanine dyes, ethyl alcohol has been employed exclusively as a diluent in the reaction mixture because the reactions proceed well at the refluxing temperature of the alcohol, i. e. from 70° to 80° C. Other diluents can be employed, e. g. methyl alcohol or n-propyl alcohol are satisfactory. The reactions can be carried out with no diluent, though it is difficult to isolate the dyes under such conditions.

In the above examples of the preparation of 2'-cyanine, i. e. pseudocyanine, dyes the basic condensing agent employed has been exclusively triethylamine. Strong tertiary organic bases, i. e. tertiary organic bases whose aqueous solutions have dissociation constants substantially greater than that of an aqueous solution of pyridine, are particularly advantageously employed, e. g. N-methylpiperidine, triethanolamine, tributylamine and triethylamine. Other basic condensing agents can be employed. Alkali metal carbonates are particularly efficacious. Pyridine, sodium hydroxide or sodium perborate can also be used. In the preparation of 4'-cyanine (isocyanine) dyes, the alkali hydroxides, such as potassium and sodium hydroxide, are advantageously employed.

2'-cyanine dyes can also be prepared by treating aralkyl quaternary salts of 2-phenylmercaptoquinoline with cyclammonium quaternary salts containing a reactive methyl group, such as 1-methylbenzothiazole, quinaline, α-picoline, 2-methyl-4-phenylthiazole or 2-methyl-4-phenyloxazole for example, according to the process given in the above examples.

Simple thiacyanines having the following formula:

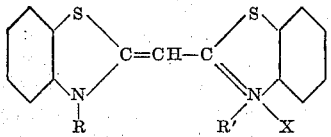

wherein R and R' represent alkyl groups, but at least one of R and R' is an aralkyl group and X represents an acid radical, can be prepared by treating 1-methylmercaptobenzothiazole aralkyl quaternary salts with 1-methylbenzothiazole quaternary salts according to the process of the above examples. Simple oxa- and selenacyanines can be similarly prepared.

2,2'-dibenzylthiacyanine iodide was obtained in the form of yellow crystals giving a yellow methyl alcoholic solution and melting at 265° to 266° C. with decomposition after recrystallization from methyl alcohol. This substance is also formed during the preparation of 2-benzyl-1'-ethylthia-2'-cyanine iodide (see Example 11 above). The thiacyanine is more soluble in methyl alcohol and can accordingly be separated from the 2'-cyanine by fractional crystallization.

Our new intermediates can be employed to prepare carbocyanine dyes, i. e cyanine dyes containing a trimethenyl chain between two heterocyclic nuclei, such as 2,2'-carbocyanines, 2,4'-carbocyanines, 4,4'-carbocyanines, thia-2'-carbocyanines, oxa-2'-carbocyanines, thiazolo-2'-carbocyanines, selenazolo-2'-carbocyanines, thia-4'-carbocyanines, selena-4'-carbocyanines, oxa-4'-carbocyanines, thiacarbocyanines, dibenzothiacarbocyanines, oxacarbocyanines, dibenzoxacarbocyanines, selenacarbocyanines, oxathiacarbocyanines, oxabenzothiacarbocyanines, benzoxathiacarbocyanines, thiazolocarbocyanines, thiathiazolocarbocyanines and the like. The following examples are illustrative of the manner of obtaining our new carbocyanine dyes from our new quaternary salts. These examples are not intended to limit our invention.

EXAMPLE 23.—*2,2'-dibenzylthiacarbocyanine iodide*

7.34 g. (2 mol.) of 1-methylbenzothiazole benziodide and 2.96 g. (2 mol. plus 100% excess) of ethyl orthoformate were heated together in 25 cc. of dry pyridine at the refluxing temperature for about forty-five minutes. The dye separated from the cooled reaction mixture. After two recrystallizations from methyl alcohol, the dye was obtained as small crystals having a bright green reflex and giving a bluish-red methyl alcoholic solution. The dye melted at 246° to 247° C. with decomposition and has the following formula:

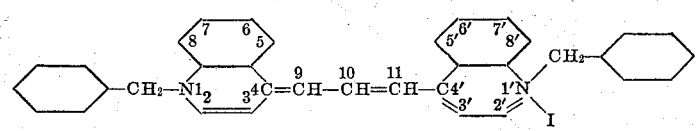

EXAMPLE 24.—*1,1'-dibenzyl-2,2'-carbocyanine bromide*

6.28 g. (2 mol.) of quinaldine benzobromide and 4.95 cc. (3 mol.) of ethyl orthoformate were heated together in 15 cc. of pyridine for about four hours at the refluxing temperature. The dye was precipitated by adding diethyl ether to the cooled reaction mixture. It was recrystallized from methyl alcohol and obtained as minute dark green crystals having a greenish-bronze reflex and giving a bluish-red methyl alcoholic solution. The dye melted at 268° to 269° C. with decomposition and has the following formula:

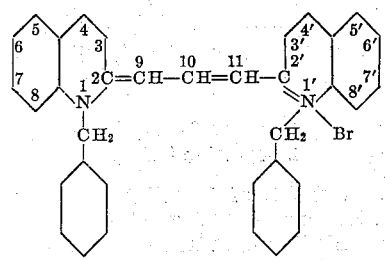

EXAMPLE 25.—*1,1'-dibenzyl-4,4'-carbocyanine iodide*

7.2 g. (2 mol.) of lepidine benziodide and 5 cc. (3 mol.) of ethyl orthoformate were heated together in 30 cc. of pyridine at the refluxing temperature for about three hours. The dye separated from the cooled reaction mixture. The product which separated contained much unchanged starting material. It was carefully extracted with methyl alcohol. The extract yielded the pure dye in the form of greenish-bronze needles which gave a blue solution in methyl alcohol. The pure dye melted at 248° to 250° C. with decomposition and has the following formula:

EXAMPLE 26.—*2,2'-di-(β-phenylethyl)-thiacarbocyanine iodide*

3.34 g. (2 mol.) of 1-methylbenzothiazole β-phenylethobromide and 2.2 g. (3 mol.) of ethyl orthoformate were heated together in 15 cc. of pyridine for about twenty-five minutes at the refluxing temperature. A concentrated aqueous solution of potassium iodide was added to the cooled reaction mixture to precipitate the dye as the dye-iodide. It was recrystallized from methyl alcohol and obtained as brassy crystals which gave a bluish-crimson methyl alcoholic solution. The dye melted at 245° to 248° C. with decomposition and has the following formula:

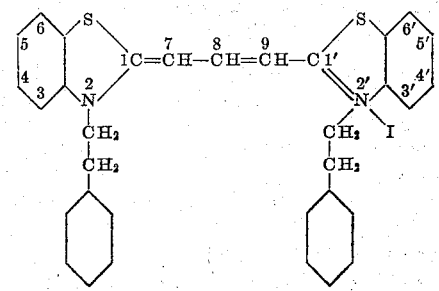

EXAMPLE 27.—*1,1'-di-(β-phenylethyl)-2,2'-carbocyanine bromide*

6.56 g. (2 mol.) of quinaldine β-phenylethobromide and 4.95 cc. (3 mol.) of ethyl orthoformate were heated together in 15 cc. of pyridine at the refluxing temperature for about four hours. Diethyl ether was added to the cooled reaction mixture to precipitate the dye. It was twice recrystallized from methyl alcohol and obtained as dark prisms with a bright greenish-bronze reflex which gave a reddish-blue methyl alcoholic solution. The dye melted at 243° to 246° C. with decomposition.

EXAMPLE 28.—1,1'-di-(β-phenylethyl)-4,4'-carbocyanine iodide 7.5 g. (2 mol.) of lepidine β-phenylethiodide and 4.95 cc. (3 mol.) of ethyl orthoformate were heated together in 15 cc. of pyridine at the refluxing temperature for about four hours. The dye separated from the cooled reaction mixture. It was recrystallized from methyl alcohol and obtained as dark needles having a bright brassy reflex and giving a greenish-blue methyl alcoholic solution.

In the above examples the pyridine functions both as a basic condensing agent and as a diluent. Pyridine is a particularly efficacious condensing agent. Other diluents can be added to the reaction mixture. The reactions are advantageously carried out at about the refluxing temperature of pyridine. In a manner similar to that illustrated in the above examples, dibenzothiacarbocyanines, oxacarbocyanines, selenacarbocyanines, thiazolocarbocyanines and thiazolinocarbocyanines containing aralkyl groups can be prepared. In the above examples instead of employing ethyl orthoformate, other esters of ortho formic acid can be used. Likewise, ethyl orthoacetate, ethyl orthopropionate and ethyl orthobenzoate can be employed in the above examples instead of ethyl orthoformate. Using these latter esters, carbocyanine dyes containing a substituent at the central carbon atom of the trimethenyl chain can be prepared.

Unsymmetrical carbocyanine dyes containing aralkyl groups can be prepared by first condensing a cyclammonium aralkyl quaternary salt containing a reactive methyl group, advantageously an aralkiodide, with diphenylformamidine, advantageously in the presence of an organic acid anhydride, such as acetic anhydride. The resulting condensation product can then be condensed with a different cyclammonium aralkyl quaternary salt containing a reactive methyl group, again advantageously an aralkiodide, in the presence of a basic condensing agent, advantageously a strong organic base, such as triethylamine or piperidine for example. In such a manner, 2,2'-dibenzyloxathiacarbocyanine iodide can be prepared for example.

Unsymmetrical carbocyanine dyes containing at least one aralkyl group on the cyanine nitrogen atoms and having an alkyl group, particularly one of the ordinary alkyl groups, such as methyl or ethyl, on the central carbon atom of the trimethenyl chain can be prepared as illustrated for the dye having the following formula:

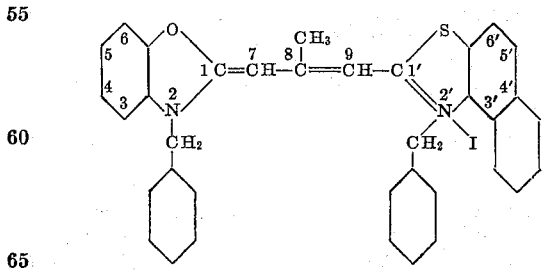

To prepare this dye, 2-methyl-β-naphthothiazol benziodide is reacted with acetyl chloride in the presence of pyridine to give 2-acetylmethylene-1-benzyl-β-naphthothiazoline. The naphthothiazoline is then condensed with 1-methylbenzoxazole benziodide in the presence of a water-binding agent, such as acetic or propionic anhydride.

Dicarbocyanine dyes containing aralkyl groups on at least one of the cyanine nitrogen atoms can be prepared by first condensing a cyclammonium aralkyl quaternary salt containing a reactive methyl group, advantageously an aralkiodide with β-anilinoacrolein anil hydrochloride, in the presence of sodium acetate and acetic anhydride. The condensation product can then be condensed with the same or a different cyclammonium aralkyl quaternary salts containing a reactive methyl group, in the presence of a basic condensing agent, advantageously a strong organic base, such as triethylamine. In such a manner 2,2'-dibenzylthiadicarbocyanine iodide can be prepared.

Tricarbocyanine dyes containing aralkyl groups on at least one of the cyanine nitrogen atoms can be prepared as illustrated in the following examples. These examples are not intended to limit our invention.

EXAMPLE 29.—2,2'-dibenzylthiatricarbocyanine iodide 7.34 g. (2 mol.) of 1-methylbenzothiazole benziodide and 2.85 g. (1 mol.) of glutaconic aldehyde dianilide hydrochloride were dispersed in about 400 cc. absolute ethyl alcohol. To the chilled dispersion, 1.7 g. (2 mol.) of piperidine were added. The whole was then allowed to stand in an ice-box for about twenty-four hours. The dye had separated from the reaction mixture. It was twice recrystallized from methyl alcohol and obtained as rosettes of green crystals which gave a blue methyl alcoholic solution. The dye melted at 202° to 204° C. with decomposition. It has the following formula:

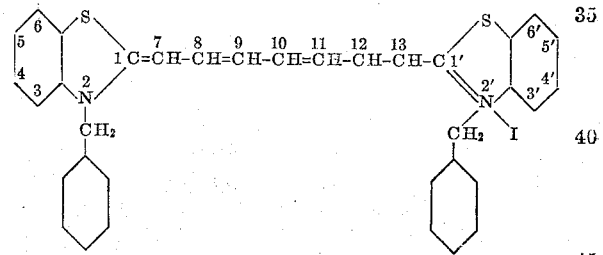

EXAMPLE 30.—2,2'-di-(β-phenylethyl)-thiatricarbocyanine iodide 2.23 g. (2 mol.) of 1-methylbenzothiazole β-phenylethobromide and 0.95 g. (1 mol.) of glutaconic aldehyde dianilide hydrochloride were dispersed in about 10 cc. of absolute ethyl alcohol. To the dispersion, 0.57 g. (2 mol.) of piperidine were added and the mixture was allowed to stand in an ice-box for about twelve hours. The dye separated from the reaction mixture. It was recrystallized from methyl alcohol and obtained as dark needles having a coppery reflex and giving a blue methyl alcoholic solution. It melted at 190° to 193° C. with decomposition.

In a manner similar to that illustrated in the above two examples, 2,2'-, selena-, dibenzothia-, thiazolino, 4,4'-, and thiazolotricarbocyanine dyes in which the alkyl groups on the cyanine nitrogen atoms are aralkyl groups can be prepared. Instead of piperidine in the above two examples, other strong organic bases can be employed, for example, triethylamine, tributylamine or diethylamine.

Our new aralkyl quaternary salts can be employed to prepare tetra- and pentacarbocyanine dyes. Our new cyclammonium aralkyl quaternary salts containing a reactive methyl group, such as 1-methylbenzothiazole benziodide or β-phenylethiodide or μ-methylnaphthothiazole benziodide or β-phenylethiodide for example, can be condensed with 4-acyloxy-Δ³,⁵-heptadiene-1,7-dial ditetrahydroquinolide perchlorate or 4-acyloxy-Δ³,⁵,⁷-nonatriene-1,9-dial ditetrahydroquinolide perchlorate, in the presence of pyridine or piperidine or a mixture of the two, to give tetra- and pentacarbocyanines respectively.

Our new cyclammonium aralkyl quaternary salts containing a reactive methyl group can be condensed with aldehydes, such as dialkylaminobenzaldehydes, dialkylaminocinnamaldehydes or the like to give dyes. The following examples are illustrative, but are not intended to limit our invention.

EXAMPLE 31.—*p-diethylaminostyrylbenzothiazole benziodide*

3.61 g. (1 mol.) of 1-methylbenzothiazole benziodide and 1.77 g. (1 mol.) of p-diethylaminobenzaldehyde were heated together in 15 cc. of absolute ethyl alcohol containing four drops of piperidine at the refluxing temperature for about four hours. The dye separated from the cooled reaction mixture. After recrystallization from methyl alcohol, the dye was obtained as minute needles having a metallic green reflex and giving a bluish-red methyl alcoholic solution. The dye melted at 218° to 221° C. with decomposition. It has the following formula:

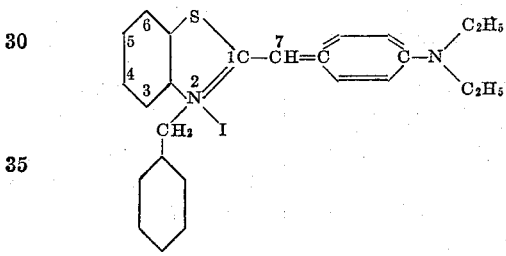

EXAMPLE 32.—*p-diethylaminostyrylbenzothiazole β-phenylethiodide*

3.81 g. (1 mol.) of 1-methylbenzothiazole β-phenylethiodide and 1.77 g. (1 mol.) of p-diethylaminobenzaldehyde were heated together in 15 cc. of absolute ethyl alcohol containing four drops of piperidine at the refluxing temperature for about four hours. The dye separated from the cooled reaction mixture. It was recrystallized from methyl alcohol and obtained as dark blue crystals having a light blue reflex and giving a bluish-red methyl alcoholic solution. It melted at 261° to 263° C. with decomposition. It has the following formula:

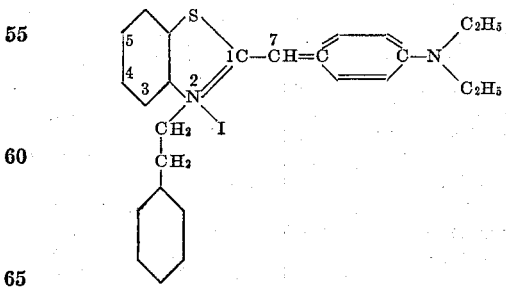

In a manner similar to that illustrated in the above two examples, other of our cyclammonium aralkyl quaternary salts containing a reactive methyl group, such as those set forth in and under Examples 2, 3, 4, 5, 7 and 8, can be condensed with dialkylamino benzaldehydes or cinnamaldehydes to give dyes. The piperidine employed in the above two examples does not act as a basic condensing agent to bind elements of acid. Rather, in the above two examples the piperidine acts as a catalyst accelerating the splitting out of water from the cyclammonium aralkyl quaternary salt and the aldehyde.

Our new dyes sensitize photographic emulsions in a novel and useful manner. Our invention is particularly directed to the customarily employed silver halide especially the silver chloride and bromide emulsions, which may contain other salts which may be light sensitive. Our invention is further particularly directed to the customarily employed gelatin emulsions. However, the gelatin can be replaced with any other carrier which has substantially no deleterious effect on the light-sensitive materials, e. g. with a cellulose derivative or a resin.

In the preparation of photographic emulsions sensitized with our new dyes, it is only necessary to thoroughly disperse a small amount of our dyes in an ordinary photographic emulsion. The suitable and most economical concentration for any given emulsion will be apparent to those skilled in the art upon making the ordinary tests and observations customarily used in the art of emulsion making. To prepare a gelatino-silver-halide emulsion the following procedure is satisfactory: A quantity of the dye is dissolved in a suitable solvent, for example methyl alcohol or acetone, advantageously the former, and a volume of this solution (which may be diluted with water) containing from 5 to 100 mg. of dye is slowly added to about 1000 cc. of an ordinary flowable gelatino-silver-halide emulsion with stirring. The dye is thoroughly incorporated. With the more powerful of our new sensitizing dyes, 10 to 20 mg. of dye per 1000 cc. of emulsion will suffice to produce maximum sensitizing effects with the ordinary gelatino-silver-halide emulsion.

The above statements are only illustrative and are not to be understood as limiting our invention in any sense as it will be apparent that these dyes can be incorporated by other methods in many of the photographic emulsions customarily employed in the art, such, for instance as by bathing a plate or film, upon which an emulsion has been coated, in a solution of the dye in an appropriate solvent, although such a method is ordinarily not to be preferred. The claims are intended to cover any combination of our new dyes with a photographic emulsion whereby the dyes exert a sensitizing effect upon the emulsion as well as a photographic element comprising a support, ordinarily transparent, upon which the light-sensitive emulsion is coated or spread and permitted to set or dry.

Figure 2:
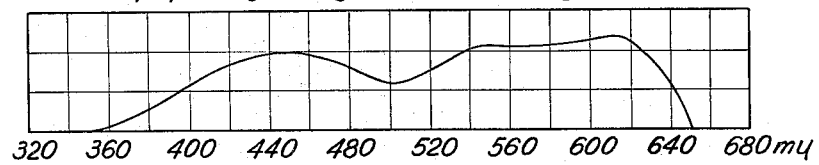
Figure 3:
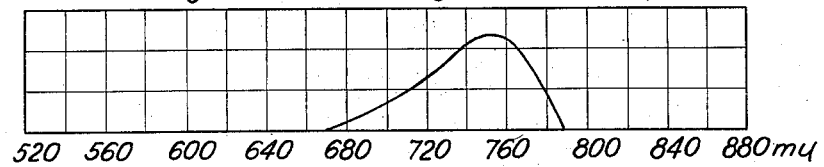
Figure 4:
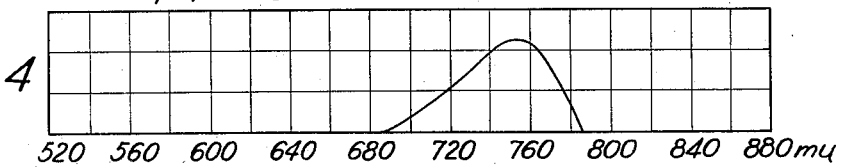
Figure 5:
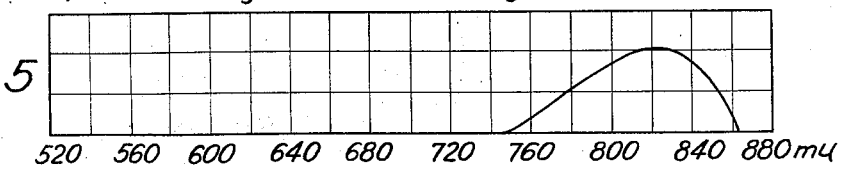

The accompanying drawing is by way of illustration and is offered primarily to show the range of sensitivity of representative members of our longer chain dyes. Each figure of the drawing is a diagrammatic reproduction of a spectrogram showing the sensitivity of an ordinary gelatino-silver-bromide emulsion containing one of our new dyes. In Fig. 1 the curve represents the sensitivity of an ordinary gelatino-silver-bromide emulsion containing 2,2'-dibenzylthiacarbocyanine iodide. In Fig. 2 the curve represents an ordinary gelatino-silver-bromide emulsion containing 2,2'-di-(β-phenylethyl)-thiacarbocyanine iodide. In Fig. 3 the curve represents the sensitivity of an ordinary gelatino-silver-bromide emulsion containing 1,1'-dibenzyl-4,4'-carbocyanine iodide. In Fig. 4 the curve represents the sensitivity of an ordinary gelatino-silver-bromide emulsion containing 1,1'-di-(β-phenylethyl)-4,4'-carbocyanine iodide. In Fig. 5 the curve represents the sensitivity of an ordinary gelatino-silver-bromide emulsion containing 2,2'-dibenzylthiatricarbocyanine iodide.

Of our new dyes, the 1,1'-dibenzyl-4,4'-carbocyanine dyes are particularly outstanding in their sensitizing power and photographic emulsions sensitized therewith are of particular utility. The 1,1'-dibenzyl-4,4'-carbocyanine dyes sensitize emulsions more strongly than any 4,4'-carbocyanine dyes known heretofore. Still further examples of our new emulsions could be given, but the foregoing will serve to teach those skilled in the art the principles of sensitizing emulsions with our new dyes. The illustrations have been confined to dyes of the longer chain types since it is this group of our dyes which is of the greatest utility in sensitizing emulsions.

In the specification and claims, by the term "cyanine nitrogen atoms" we mean the two nitrogen atoms essential to the cyanine dye chromophor, i. e. the two nitrogen atoms, the one tervalent and the other quinquevalent, which are linked together by a conjugated carbon chain. For example, in a dye such as 1,1'-dibenzyl-4,4'-carbocyanine iodide which is formulated as follows:

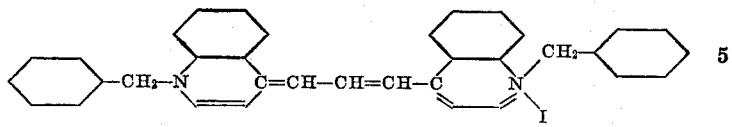

there are two nitrogen atoms (the cyanine nitrogen atoms) linked together by a conjugated chain.

What we claim as our invention and desire to be secured by Letters Patent of the United States is:

1. A 1,1'-diaralkyl-4,4'-carbocyanine salt in which the aralkyl groups are devoid of nitro groups, the aryl nucleus in each of said aralkyl groups being a single ring nucleus of the benzene series.

2. A 1,1'-diaralkyl-4,4'-carbocyanine halide in which the aralkyl groups are devoid of nitro groups, the aryl nucleus in each of said aralkyl groups being a single ring nucleus of the benzene series.

3. 1,1'-dibenzyl-4,4'-carbocyanine iodide.

4. A 1,1'-dibenzyl-4,4'-carbocyanine salt.

5. A 1,1'-dibenzyl-4,4'-carbocyanine halide.

LESLIE G. S. BROOKER.
LLOYD A. SMITH.